Nov. 4, 1969 R. H. BRANDES 3,475,970
SPEED-ACCELERATION GOVERNOR WITH FLUID COUPLED INERTIA MEANS
Filed Dec. 21, 1967
2 Sheets-Sheet 1

INVENTOR.
Roy H. Brandes
BY
Robert J. Outland
ATTORNEY

Nov. 4, 1969  R. H. BRANDES  3,475,970
SPEED-ACCELERATION GOVERNOR WITH FLUID COUPLED INERTIA MEANS
Filed Dec. 21, 1967  2 Sheets-Sheet 2

INVENTOR.
Roy H. Brandes
BY
Robert J. Outland
ATTORNEY

United States Patent Office 3,475,970
Patented Nov. 4, 1969

3,475,970
SPEED ACCELERATION GOVERNOR WITH FLUID COUPLED INERTIA MEANS
Roy H. Brandes, Utica, Mich., assignor to General Motors Corporation, Detroit, Mich., a corporation of Delaware
Filed Dec. 21, 1967, Ser. No. 692,495
Int. Cl. G01p *3/04;* G05d *13/08, 13/10*
U.S. Cl. 73—512                                   12 Claims

ABSTRACT OF THE DISCLOSURE

A speed-acceleration governor having a rotatably mounted inertia member which is coupled to a centrifugally actuated speed sensing control element by fluid coupling means. The arrangement eliminates the wear and speed error of conventional mechanical couplings. Various fluids may be utilized in the coupling means including liquids, such as silicone, or semi-solids, such as grease, with appropriate structural modifications to accommodate them.

BACKGROUND OF THE INVENTION

This invention relates to governors and in particular to speed-acceleration governors of the type having an inertia member rotatable with and coupled to a speed sensing member to apply an acceleration effect to the speed control accomplished by the governor.

Many types of speed governors are utilized for controlling the speed of engines and other mechanical devices including governors which control the driving force on the controlled device in response to both its speed and acceleration conditions. In such speed-acceleration governors, it is known to include a control member movable in response to a change in speed and to couple it with an inertia weight which modifies the action of the control member in response to the rate of speed change at a particular instant. In such governors, the coupling between the inertia weight and the control element is commonly accomplished by a mechanical connecting linkage of some type. Such linkages are often subject to fretting and wear due to torque fluctuations and torsional vibrations in the engine or other device being controlled by the governor. Additionally, any friction which may be present in the connection may cause an error in the position of the speed control element and thus affect the accuracy of the governed speed.

SUMMARY OF THE INVENTION

The present invention eliminates many of the problems caused by the use of mechanical couplings between the speed control element and the inertia weight member of a speed-acceleration governor by providing fluid coupling means in place of the mechanical coupling linkage normally used. The concept involves retaining a mass of suitable fluid in either the inertia weight means or the control element and applying paddles or vanes to the other of the two so that the vanes extend into the fluid mass and transmit torque between the control element and inertia means during periods of their relative rotation. Suitable means for retaiinng the fluid in the selected member are provided depending on the type of fluid used. Such fluids may include either liquids, preferably those of high viscosity or semi-solid materials such as grease.

Since the fluid coupling means may not be ideally suited for driving the inertia weight during normal starting and stopping conditions, the invention also provides optional centrifugally actuated means for mechanically coupling the control element support to the inertia member at speeds below those of normal operation. The mechanical coupling is engaged during starting and stopping only leaving the fluid coupling to operate under normal running conditions.

These and other features of the invention will be more easily understood by reference to the following description taken in connection with the accompanying drawings which form a part of the application.

DESCRIPTION OF THE PREFERRED EMBODIMENTS

Figure 1:
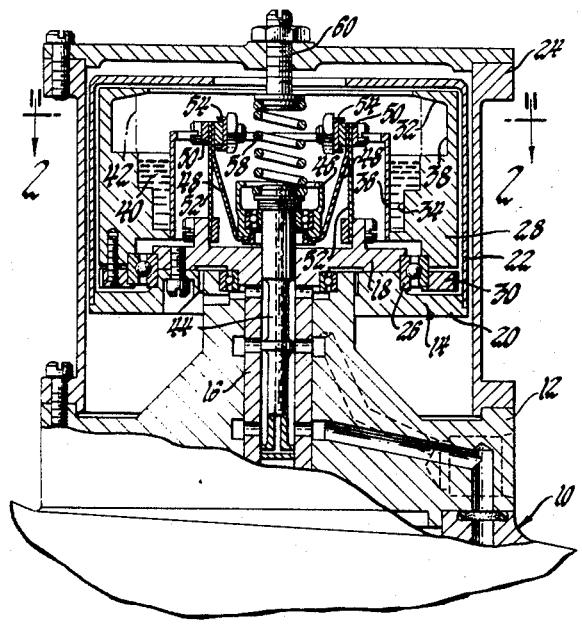
FIGURE 1 is a transverse cross-sectional view of a preferred embodiment of a speed-acceleration governor having fluid coupling means according to the present invention.
Figure 2:
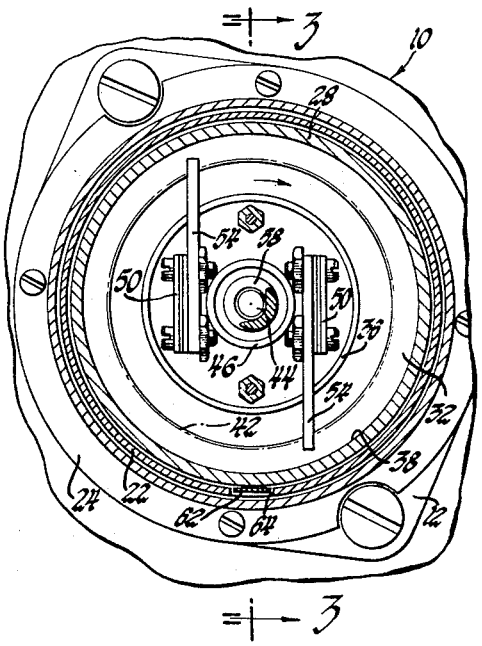
FIGURE 2 is a cross-sectional view across the rotational axis of the embodiment of FIGURE 1 taken generally along the plane indicated by line 2—2 of FIGURE 1.
Figure 3:
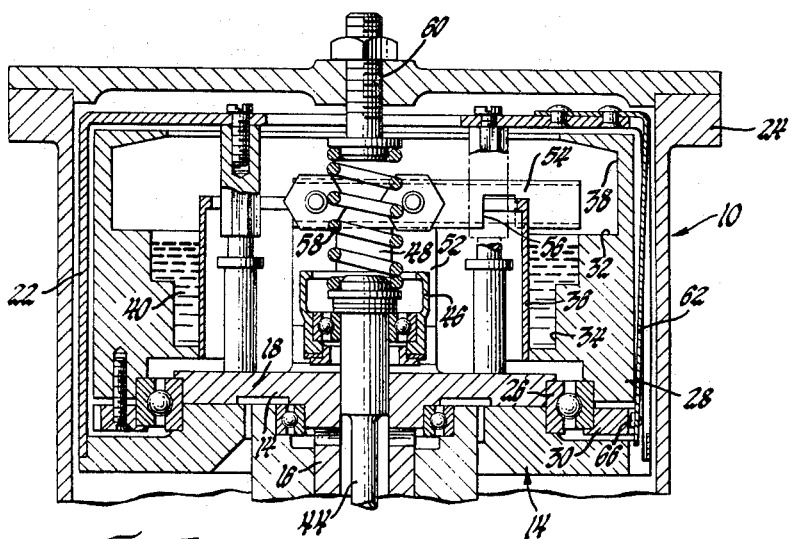
FIGURE 3 is a transverse cross-sectional view of the embodiment of FIGURES 1 and 2 taken generally in the plane indicated by line 3—3 of FIGURE 2.

Referring now more particularly to FIGURES 1 through 3 of the drawings, there is shown a preferred embodiment of a speed-acceleration governor generally indicated by numeral 10. Governor 10 includes a base 12 rotatably supporting a rotor 14 driven at a speed proportional to the device to be governed through connecting mechanism (not shown). Rotor 14 includes a downwardly extending cylindrical portion 16 terminating at its upper end in a flange-like flyweight support 18. A retainer 20 is secured to portion 18 and, in turn, mounts a rotor shield assembly 22. This shield is enclosed by a two-piece cover 24.

Annular inertia means are rotatably supported on the rotor 14 by means of a ball bearing 26. The inertia means include an annular weight 28 secured to the bearing by means of an externally toothed retainer 30 and having an inwardly opening annular recess or pocket 32. A lower portion 34 of pocket 32 is stepped inwardly and is enclosed by an annular wall 36 secured to the inner diameter of weight 28 and terminating inward of the deep upper portion 38 of pocket 32.

A mass of viscous liquid 40, such as silicone, is retained in pocket 32 and, when the governor is in the stopped position, substantially fills the pocket lower portion 34 as shown in FIGURES 1 and 2. Wall 36 prevents the escape of the liquid from the pocket in the stopped condition. During rotation of the inertia weight at operating speed, the liquid 40 is forced upwardly and outwardly into the upper portion 38 of the pocket and, due to the action of centrifugal force, takes a position substantially as indicated by the phantom lines 42.

Reciprocably carried within rotor 14 is a piston 44 which coacts with openings in the cylindrical portion 16 of the rotor to control the flow of oil to external mechanism (not shown) by means of which the force driving the governed device is controlled. The piston is arranged in a known manner such that in the position shown in the drawings, the speed of the governed device is held constant. When the piston is above the illustrated position, oil is permitted to flow so as to decrease the speed and when the piston is below the illustrated position, oil is permitted to flow so as to increase the speed of the governed device.

Adjacent the upper end of piston 44, a bearing supported retainer 46 connects with flexible steel tie members 48 which are attached to flyweights 50. The flyweights are resiliently supported by steel springs 52 on the flyweight support portion 18 of the rotor 14. A vane 54 is secured to and forms a part of each flyweight. The vanes extend outwardly over the wall 36 having cutouts 56 to permit this. Each vane extends beyond the line 42 and partly into the upper portion 38 of pocket 32 so as to contact the liquid 40 when it is contained therein.

A spring 58 extends between the upper end of piston 44 and an adjusting screw 60 which is mounted in cover 24. The spring urges the piston 44 downwardly and the flyweights 50 inwardly. Adjustment of screw 60 varies the downward force on the spring and, as a result, varies the controlled operating speed of the governor and governed device.

An inwardly biased steel spring finger 62 is secured to the rotor shield assembly 22 and extends through a slot 64 in the wall thereof to engage, with a tooth-like projection 66, the teeth of retainer 30. Spring finger 62 is adapted to move outwardly under the centrifugal force of normal operating speed so as to disengage projection 66 from retainer 64 for a purpose to be subsequently described.

The operation of the governor illustrated in FIGURES 1 through 3 is as follows. Screw 60 is adjusted to obtain a downward bias on piston 44 so as to select a predetermined desired speed of operation. At the time of starting the governed device, flyweights 50 are held inwardly by spring 58 so that the governor calls for an increase in speed up to the normal operating speed. The positive engagement of spring finger 62 with retainer 30 causes inertia weight 28 to be accelerated at the same rate as rotor 14. This forces the liquid mass 40 outwardly into the upper portion 38 of the pocket, where it is in contact with the outer ends of vanes 54. At a predetermined speed, finger 62 moves outwardly disengaging the inertia weight 28 from the rotor except through its supporting bearing 26. Since here is very little resistance to rotation in this bearing, the inertia weight is then driven primarily through the fluid coupling created by the vanes 54 extending from flyweights 50 into the liquid 40 retained in pocket 32.

When the predetermined set operating speed is reached, flyweights 50 move outwardly to the neutral position shown in FIGURES 1 through 3, stopping any further increase in speed. If the speed of the governed device increases, for example, due to a decrease in load, the rotor, which is arranged to turn clockwise as shown in the arrow of FIGURE 2, tends to rotate faster than the inertia weight 34, this causes an increased force of liquid 40 on the vanes 54 and moves the flyweights outwardly. This movement actuates piston 44 to reduce the driving force of the governed device so as to return it to the predetermined governed speed.

Conversely, if the speed of the governed device decreases, rotor 14 slows down with respect to inertia weight 34 resulting in a change in liquid force on the vanes 54, urging the flyweights 50 inwardly to increase the driving force and return the governed device to its selected operating speed. In each case, the usual centrifugal action of the flyweights is also operative to hold the predetermined speed or to return to such speed.

Figure 4:
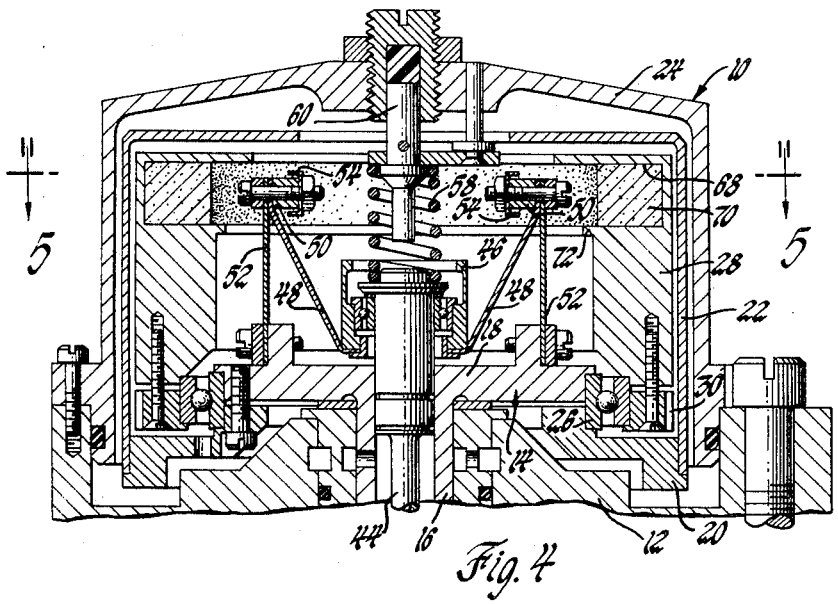
FIGURE 4 is a transverse cross-sectional view of an alternative embodiment of a governor having fluid coupling means according to the invention.
Figure 5:
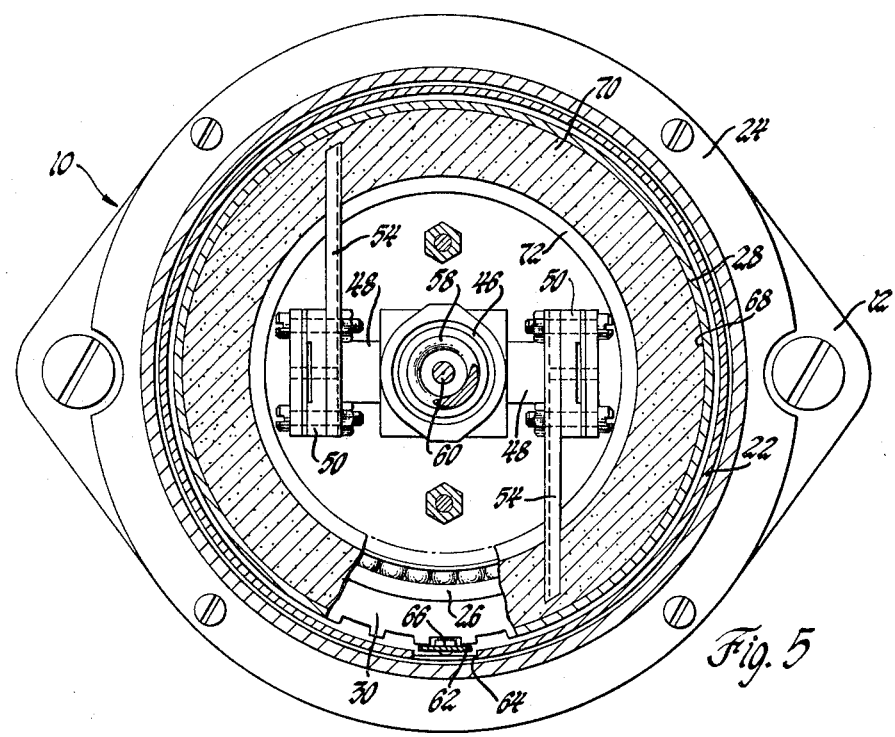
FIGURE 5 is a cross-sectional view of the embodiment of FIGURE 4 taken generally in the plane indicated by line 5—5 of the figure.

The embodiment of FIGURES 4 and 5, although somewhat different in physical appearance, includes nearly all the same elements as the embodiment of FIGURES 1 through 3 and, for purposes of illustration, like numerals are used to refer to similar parts having the same functional purposes.

The important difference between these embodiments is that the latter makes use of a semi-solid grease material as a driving fluid rather than the liquid of the first described embodiment. This difference permits several changes in construction from the first embodiment, one of which is that the inertia weight has an annular pocket 68 which is different in shape than pocket 32 of the first described embodiment. Pocket 68 is located at the upper end of the inertia weight and retains the semi-solid grease 70. The grease is sufficiently fluid to permit a limited rate of relative movement of the vanes 54 with respect to the inertia weight 28 while being retained within the pocket by the action of centrifugal force at normal operating speeds. At the same time, the grease is sufficiently solid so as not to flow out of the pocket when the governor is stopped. Accordingly, the unit may be mounted in any physical position on the engine. In addition, the use of a retaining wall such as wall 36 of the first embodiment is not necessary and, as a result, the cutouts 56 in the vanes 54 are not needed. A slight projecttion 72 extending radially inward below pocket 68 is sufficient to prevent the escape of the grease under normal operating conditions.

In all other details of significance to the present invention, the embodiment of FIGURES 4 and 5 is similar to that of FIUGRES 1 through 3. The operation of the two embodiments is also similar, differing only in that the grease remains in the pocket in contact with the vanes at all times.

The resilient finger member 62 is used in both embodiments. In the liquid driven version, it accelerates and decelerates the inertia weight rapidly instead of requiring the friction of the supporting ball bearing to accomplish this as would be the case when the liquid is in the lower portion 34 of the pocket. In the grease driven version, the use of the spring finger prevents grease from being scooped out of the pocket by the vanes due to quick stops and starts. It would, of course, be possible to operate either version without such a centrifugally operated connection since the bearing friction would eventually accelerate the weight to operating speed and stop it.

The use of the term fluid, where used in the specification and claims of this application, is intended to encompass both liquid and semi-solid substances such as the viscous liquid and the semi-flowable grease utilized in the disclosed embodiments.

Since numerous changes could be made within the spirit and scope of the invention as disclosed herein, it is intended that the invention be limited only by the language of the following claims read in the light of the foregoing specification.

What is claimed is:
1. A speed governor comprising:
  a rotatable member,
  a centrifugally actuated control element carried by said member and movable in response to changes in the rotational speed of said member to actuate speed control means,
  an inertia weight mounted for rotation with respect to said rotatable member and adapted to be driven by said control element and
  fluid means drivingly connecting said control element with said inertia weight, said means being effective to drive said inertia weight and to transmit force from said inertia weight to said control element to modify the action of said control element in a desired manner.

2. The governor of claim 1 wherein said fluid means comprises a liquid such as a high viscosity silicone.

3. The governor of claim 1 wherein said fluid means comprises a semi-solid such as grease.

4. The governor of claim 1 and further including mechanical driving means connecting said rotatable member and said inertia weight, said driving means being responsive to speed above a predetermined minimum to disengage said connection and leave said fluid means as the primary driving connection between said member and weight.

5. Speed governing mechanism comprising
  a rotatable member, a centrifugal control element carried by said member and movable in response to variations in the rotational speed of said rotatable member to actuate speed control means, inertia means mounted for rotation with respect to said rotatable member, said inertia means including an inwardly opening annular pocket, a mass of viscous fluid retained by said inertia means in said annular pocket at least during rotation of said rotatable member at normal operating speeds and at least one vane member forming a part of said centrifugal control element and extending into said viscous fluid, whereby contact between said vane member and said fluid is effective to transmit torque between said control element and said inertia means whenever a difference in rotational speed exists therebetween such that said inertia means is driven by said control element and the controlling movement of said control element is affected by relative movement of said inertia means and said rotatable member.

6. Speed governing mechanism according to claim 5 wherein said inertia means and said rotatable member are connected by bearing means, said bearing means exerting a non-positive driving force between said inertia means and said rotatable member during relative rotation thereof.

7. Speed governing mechanism according to claim 5 and further including mechanical driving means effective to drivingly connect said rotatable member and said inertia means at predetermined rotational speeds of said member below normal operating speeds, whereby starting and stopping of said inertia means is effectively accomplished.

8. Speed governing mechanism according to claim 7 wherein said mechanical driving means comprises a resilient finger carried by said rotatable member, said finger being biased into engagement with a toothed portion of said inertia means at predetermined speeds below normal operating speed and said finger being movable out of engagement with said inertia means due to the action of centrifugal force so as to be disengaged during normal governing operation.

9. Speed governing mechanism according to claim 7 wherein said mass of viscous fluid comprises a liquid such as silicone and said annular pocket includes a lower portion inwardly closed by an annular wall of said inertia means, said wall and lower portion forming an upwardly opening pocket within which said liquid is received when said mechanism is stopped.

10. Speed governing mechanism according to claim 7 wherein said mass of viscous fluid comprises a semi-solid material such as grease.

11. Speed governing mechanism comprising
a rotatable member,
a plurality of centrifugally actuated flyweights carried by said member and radially movable in response to variations in the rotational speed of said member to actuate speed control means,
inertia means mounted for rotation on said rotatable member, said inertia means including an inwardly opening annular recess,
a mass of viscous fluid retained by said inertia means in said annular pocket at least during rotation of said member at normal operating speeds and
a plurality of vanes, at least one extending from each of said flyweights into said viscous fluid
whereby contact of said vane member and said fluid is effective to transmit torque between said control element and said inertia means and the controlling movement of said flyweights is modified by relative movement of said inertia means and said rotatable member.

12. Speed governing mechanism as defined by claim 11 and further including centrifugal means positively connecting said rotatable member and said inertia means at predetermined speeds of said member below normal operating speed, said centrifugal means being responsive to centrifugal force at normal operating speeds to disconnect said positive connection.

References Cited
UNITED STATES PATENTS

| 2,754,106 | 6/1956 | Ifield | 73—512 |
| 2,975,794 | 3/1961 | Fischer | 137—48 |

JAMES J. GILL, Primary Examiner

H. GOLDSTEIN, Assistant Examiner

U.S. Cl. X.R.

137—48